United States Patent
Hu et al.

(10) Patent No.: US 11,539,304 B2
(45) Date of Patent: Dec. 27, 2022

(54) INDIRECT MATRIX CONVERTER AND RECTIFIER MODULE

(71) Applicant: DELTA ELECTRONICS, INC., Taoyuan (TW)

(72) Inventors: Kai-Wei Hu, Taoyuan (TW); Lei-Chung Hsing, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 107 days.

(21) Appl. No.: 16/991,750

(22) Filed: Aug. 12, 2020

(65) Prior Publication Data

US 2021/0067052 A1 Mar. 4, 2021

(30) Foreign Application Priority Data

Aug. 28, 2019 (CN) .......................... 201910801090.7

(51) Int. Cl.
*H02M 7/219* (2006.01)
*H02M 5/458* (2006.01)

(52) U.S. Cl.
CPC .......... *H02M 5/4585* (2013.01); *H02M 7/219* (2013.01)

(58) Field of Classification Search
CPC ................................................. H02M 5/40–48
See application file for complete search history.

(56) References Cited

U.S. PATENT DOCUMENTS 4,039,864 A * 8/1977 Tokunaga ............ H03K 17/725
  327/462
7,633,771 B2 * 12/2009 Sack .................... H02M 5/4585
  363/125

(Continued)

FOREIGN PATENT DOCUMENTS

CN 102594243 A 7/2012
CN 203289117 U 11/2013

(Continued)

OTHER PUBLICATIONS

L. Wei and T. A. Lipo, "A novel matrix converter topology with simple commutation," Conference Record of the 2001 IEEE Industry Applications Conference. 36th IAS Annual Meeting (Cat. No. 01CH37248), 2001, pp. 1749-1754 vol.3. (Year: 2001).*

(Continued)

*Primary Examiner* — Peter M Novak
(74) *Attorney, Agent, or Firm* — Muncy, Geissler, Olds & Lowe, P.C.

(57) ABSTRACT

An indirect matrix converter includes a rectifier module, an inverter module, and a control unit. The rectifier module includes three parallel-connected T-type bridge arms, and each T-type bridge arm includes a bidirectional switch and a power bridge arm. The power bridge arm includes a first switch and a second switch connected to the first switch in series. One end of the bidirectional switch is coupled to a first AC power source, and the other end thereof is coupled to a common contact between the first switch and the second switch. The control unit outputs a plurality of control signals to control the rectifier module and the inverter module, so that the first AC power source is converted into a second AC power source, or the second AC power source is converted into the first AC power source.

18 Claims, 9 Drawing Sheets

(56) References Cited

U.S. PATENT DOCUMENTS

| | | | | |
|---|---|---|---|---|
| 2007/0053213 A1* | 3/2007 | Brune | ................. | H02M 7/5388 |
| | | | | 363/37 |
| 2007/0177407 A1 | 8/2007 | Bruckmann | | |
| 2013/0188404 A1 | 7/2013 | Nakamura | | |
| 2015/0054343 A1* | 2/2015 | Cui | ...................... | H02M 7/797 |
| | | | | 307/66 |
| 2018/0309379 A1* | 10/2018 | Basic | ................... | H02M 5/458 |
| 2020/0358289 A1* | 11/2020 | Kolhatkar | ............... | F03D 7/028 |

FOREIGN PATENT DOCUMENTS

| | | |
|---|---|---|
| CN | 107196523 B | 4/2019 |
| JP | 2006296098 A | 10/2006 |
| TW | 201911730 A | 3/2019 |

OTHER PUBLICATIONS

Taiwan Office Action with Search Report cited in counterpart application No. TW108130733, dated Oct. 23, 2020, 11 pages.

\* cited by examiner

INDIRECT MATRIX CONVERTER AND RECTIFIER MODULE

BACKGROUND

Technical Field

The present disclosure relates to an indirect matrix converter with bidirectional power flow, and more particularly to an indirect matrix converter with bidirectional power flow that saves the number of bidirectional switch elements.

Description of Related Art

The statements in this section merely provide background information related to the present disclosure and do not necessarily constitute prior art.

An AC-to-AC converter is a device that converting an AC power source with a set frequency, phase angle, phase rotation, and voltage to another AC Power source with a different frequency, phase angle, phase rotation, and voltage. One of the possible manners to increase power density and reliability is to use the structure of a matrix converter. As shown in FIG. 1, which shows a block circuit diagram of a conventional direct matrix converter. The conventional direct matrix converter converts the three-phase AC input to the three-phase AC output by using nine bidirectional switches 202, and each phase of the three-phase input has three bidirectional switches 202 connected to the three-phase output. As shown in FIG. 1, when the direct matrix converter converts a first AC power source Vac1 and a second AC power source Vac2, no intermediate energy conversion element is used, and the voltage and current conversion are performed in the first stage converter. Since there is no conventional DC electrolytic capacitor used in the direct matrix converter, the power density of the overall system can be improved.

However, the conventional direct matrix converter requires nine bidirectional switches 202 for bidirectional conversion of the AC power source, and since the bidirectional switch 202 is a special power transistor component, which is relatively expensive, thus the conventional direct matrix converter is expensive. In addition, since the bidirectional switch 202 is also an integrated package component, the occupied volume of these bidirectional switches is large and cannot reduce the circuit volume of the overall system.

Therefore, how to design an indirect matrix converter and a rectifier module, by using the special circuit structure design of the indirect matrix converter to significantly reduce the use of the bidirectional switch, thereby further increasing the power density of the overall system, reducing the circuit volume, and reducing the circuit cost of the overall system is an important topic for the inventor.

SUMMARY

In order to solve the above-mentioned problems, an indirect matrix converter with high power density and low voltage bidirectional switch usage is provided. The indirect matrix converter includes a rectifier module, an inverter module, and a control unit. The rectifier module is coupled to a first AC power source and includes three parallel-connected T-type bridge arms. Each T-type bridge arm includes a bidirectional switch and a power bridge arm. The bidirectional switch has a first end and a second end, the first end of the bidirectional switch is coupled to the first AC power source. The power bridge arm includes a first switch and a second switch connected the first switch in series, one end of the first switch and one end of the second switch are coupled to the second end of the bidirectional switch, and the other end of the first switch is a positive polarity end of a bus path and the other end of the second switch is a negative polarity end of the bus path. The inverter module is coupled to the bus path and a second AC power source. The control unit outputs a plurality of control signals to control the rectifier module and the inverter module so that the first AC power source is converted into the second AC power source through the rectifier module and the inverter module, or the second AC power source is converted into the first AC power source through the inverter module and the rectifier module.

In one embodiment, the first switch is connected to a first diode in parallel and the second switch is connected to a second diode in parallel; a first current path is formed through the first AC power source, the bidirectional switch, the first diode, and the positive polarity end; a second current path is formed through the first AC power source, the bidirectional switch, the second switch, and the negative polarity end.

In one embodiment, a third current path is formed through the positive polarity end, the first switch, the bidirectional switch, and the first AC power source; a fourth current path is formed through the negative polarity end, the second diode, the bidirectional switch, and the first AC power source.

In one embodiment, when an AC current of the first AC power source is positive, the first current path and the second current path are provided; when the AC current is negative, the third current path and the fourth current path are provided.

In one embodiment, the bidirectional switch includes a first rectifier bridge arm, a transistor, and a second rectifier bridge arm. The first rectifier bridge arm includes a first rectifier diode and a second rectifier diode connected to the first rectifier diode in series, and a common contact between the first rectifier diode and the second rectifier diode is the first end of the bidirectional switch. The transistor is connected to the first rectifier bridge arm in parallel. The second rectifier bridge arm is connected to the first rectifier bridge arm in parallel, and includes a third rectifier diode and a fourth rectifier diode connected to the third rectifier diode in series, and a common contact between the third rectifier diode and the fourth rectifier diode is the second end of the bidirectional switch.

In one embodiment, the bidirectional switch includes a first transistor and a second transistor. The first transistor is connected to a third diode in parallel, and a collector of the first transistor is the first end of the bidirectional switch. The second transistor is connected to a fourth diode in parallel, and a collector of the second transistor is the second end of the bidirectional switch. The first transistor is connected to the second transistor in series, and an emitter of the first transistor is coupled to an emitter of the second transistor.

In one embodiment, the bidirectional switch includes a first transistor and a second transistor. The first transistor is connected to a third diode in parallel, and an emitter of the first transistor is the first end of the bidirectional switch. The second transistor is connected to a fourth diode in parallel, and an emitter of the second transistor is the second end of the bidirectional switch. The first transistor is connected to the second transistor in series, and a collector of the first transistor is coupled to a collector of the second transistor.

In one embodiment, the bidirectional switch includes a first transistor and a second transistor. One end of the first transistor is the first end of the bidirectional switch and the other end of the first transistor is the second end of the bidirectional switch. The second transistor is coupled to the first transistor in anti-parallel.

In one embodiment, no energy storage capacitor is used between the positive polarity end and the negative polarity end.

In one embodiment, the control unit outputs the plurality of control signals to the bidirectional switch and the power bridge arm so that the first AC power source is converted into a DC power source through the bidirectional switch and the power bridge arm, or the DC power source is converted into the first AC power source through the power bridge arm and the bidirectional switch.

In order to solve the above-mentioned problems, a rectifier module is provided. The rectifier module includes three parallel-connected T-type bridge arms. Each T-type bridge arm includes a bidirectional switch and a power bridge arm. The bidirectional switch has a first end and a second end, the first end of the bidirectional switch is coupled to the first AC power source. The power bridge arm includes a first switch and a second switch connected the first switch in series, one end of the first switch and one end of the second switch are coupled to the second end of the bidirectional switch, and the other end of the first switch is a positive polarity end of a bus path and the other end of the second switch is a negative polarity end of the bus path. The control unit outputs a plurality of control signals to control the bidirectional switch and the power bridge arm so that the first AC power source is converted into a DC power source through the bidirectional switch and the power bridge arm, or the DC power source is converted into the first AC power source through the power bridge arm and the bidirectional switch.

In one embodiment, the first switch is connected to a first diode in parallel and the second switch is connected to a second diode in parallel. A first current path formed from the first AC power source to the positive polarity end includes the first AC power source, the bidirectional switch, the first diode, and the positive polarity end. A second current path formed from the first AC power source to the negative polarity end includes the first AC power source, the bidirectional switch, the second diode, and the negative polarity end.

In one embodiment, a third current path formed from the positive polarity end to the first AC power source includes the positive polarity end, the first switch, the bidirectional switch, and the first AC power source. A fourth current path formed from the negative polarity end to the first AC power source includes the negative polarity end, the second diode, the bidirectional switch, and the first AC power source.

In one embodiment, when an AC current of the first AC power source is positive, the first current path and the second current path are provided. When the AC current is negative, the third current path and the fourth current path are provided.

In one embodiment, the bidirectional switch includes a first rectifier bridge arm, a transistor, and a second rectifier bridge arm. The first rectifier bridge arm includes a first rectifier diode and a second rectifier diode connected to the first rectifier diode in series, and a common contact between the first rectifier diode and the second rectifier diode is the first end of the bidirectional switch. The transistor is connected to the first rectifier bridge arm in parallel. The second rectifier bridge arm is connected to the first rectifier bridge arm in parallel, and includes a third rectifier diode and a fourth rectifier diode connected to the third rectifier diode in series, and a common contact between the third rectifier diode and the fourth rectifier diode is the second end of the bidirectional switch.

In one embodiment, the bidirectional switch includes a first transistor and a second transistor. The first transistor is connected to a third diode in parallel, and a collector of the first transistor is the first end of the bidirectional switch. The second transistor is connected to a fourth diode in parallel, and a collector of the second transistor is the second end of the bidirectional switch. The first transistor is connected to the second transistor in series, and an emitter of the first transistor is coupled to an emitter of the second transistor.

In one embodiment, the bidirectional switch includes a first transistor and a second transistor. The first transistor is connected to a third diode in parallel, and an emitter of the first transistor is the first end of the bidirectional switch. The second transistor is connected to a fourth diode in parallel, and an emitter of the second transistor is the second end of the bidirectional switch. The first transistor is connected to the second transistor in series, and a collector of the first transistor is coupled to a collector of the second transistor.

In one embodiment, the bidirectional switch includes a first transistor and a second transistor. One end of the first transistor is the first end of the bidirectional switch and the other end of the first transistor is the second end of the bidirectional switch. The second transistor is coupled to the first transistor in anti-parallel.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
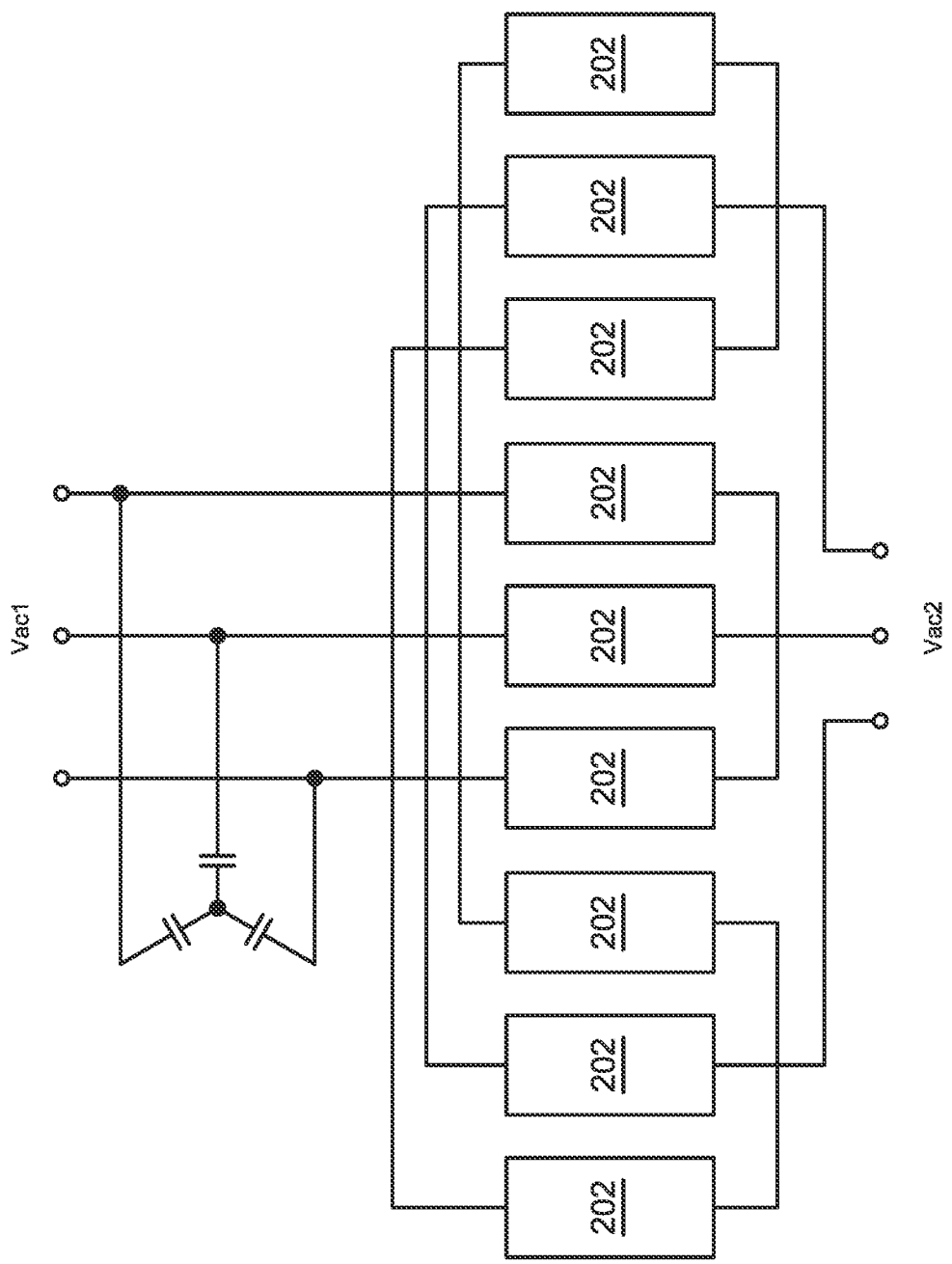
FIG. 1 is a block circuit diagram of a conventional direct matrix converter.

Reference will now be made to the drawing figures to describe the present disclosure in detail. It will be understood that the drawing figures and exemplified embodiments of present disclosure are not limited to the details thereof.

Figure 2:
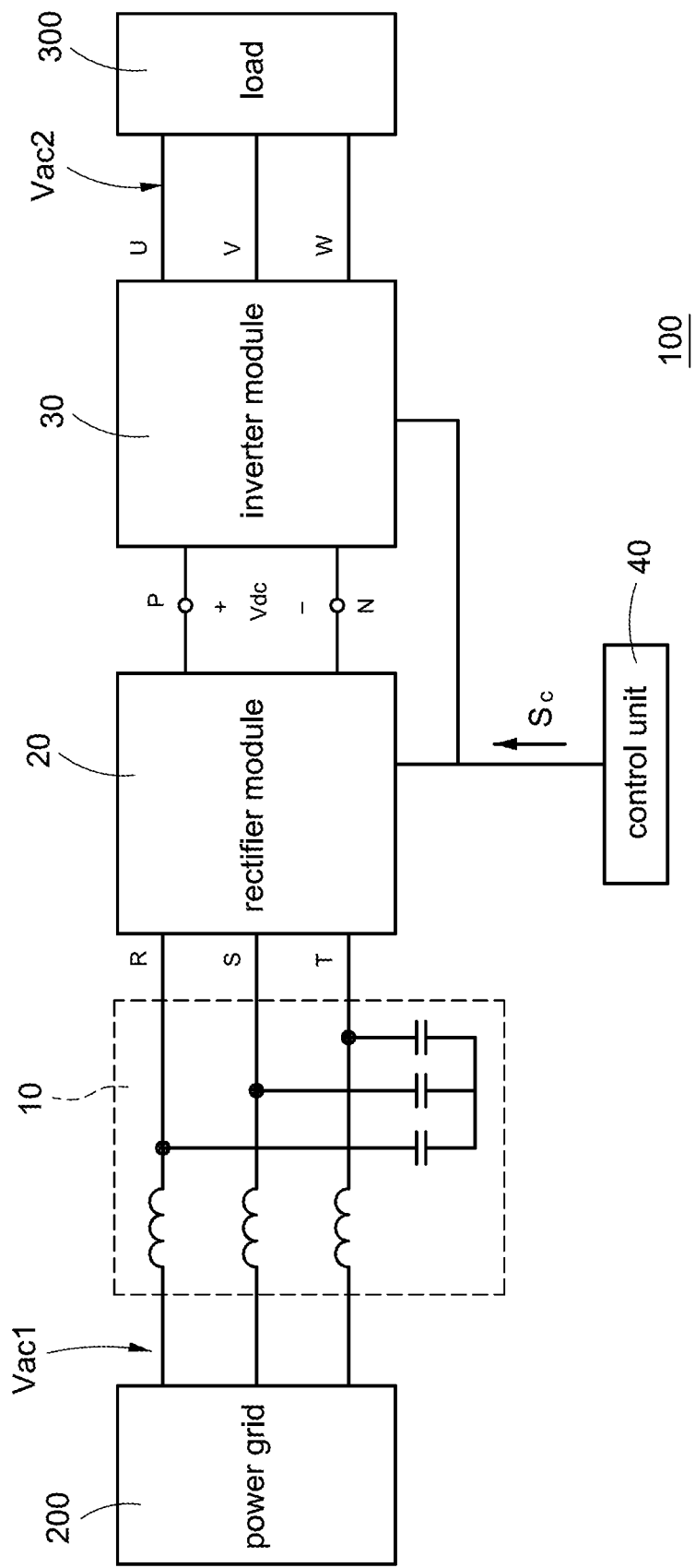
FIG. 2 is a block circuit diagram of an indirect matrix converter according to the present disclosure.

Please refer to FIG. 2, which shows a block circuit diagram of an indirect matrix converter according to the present disclosure. The indirect matrix converter 100 is coupled to a power grid 200 and a load 300. The indirect matrix converter 100 converts a first AC power source Vac1 provided by the power grid 200 into a second AC power source Vac2, and provides the second AC power source Vac2 to the load 300, such as but not limited to an AC motor. Alternatively, the indirect matrix converter 100 converts the second AC power source Vac2 provided by the load 300 into the first AC power source Vac1, and feeds the first AC power source Vac1 to the power grid 200.

The indirect matrix converter 100 includes a filter module 10, a rectifier module 20, an inverter module 30, and a control unit 40. The rectifier module 20 is coupled to the first AC power source Vac1 through the filter module 10, and the inverter module 30 is coupled to the rectifier module 20 and the second AC power source Vac2. The control unit 40 is coupled to the rectifier module 20 and the inverter module 30, and outputs a plurality of control signals Sc to control the rectifier module 20 and the inverter module 30. Specifically, the indirect matrix converter 100 is a bidirectional converter. The control unit 40 can use the control signals Sc to control the rectifier module 20 to convert the first AC power source Vac1 into a DC power source Vdc, and control the inverter module 30 to convert the DC power source Vdc into the second AC power source Vac2. Alternatively, the control unit 40 can use the control signals Sc to control the inverter module 30 to convert the second AC power source Vac2 into the DC power source Vdc, and control the rectifier module 20 to convert the DC power source Vdc into the first AC power source Vac1. In one embodiment, the filter components used in the filter module 10 (such as but not limited to capacitors or inductors) are only suitable for filtering, and are not used for storing energy, so the capacitance value or inductance value of the filter components can be designed to be small to reduce the volume thereof.

Figure 3:
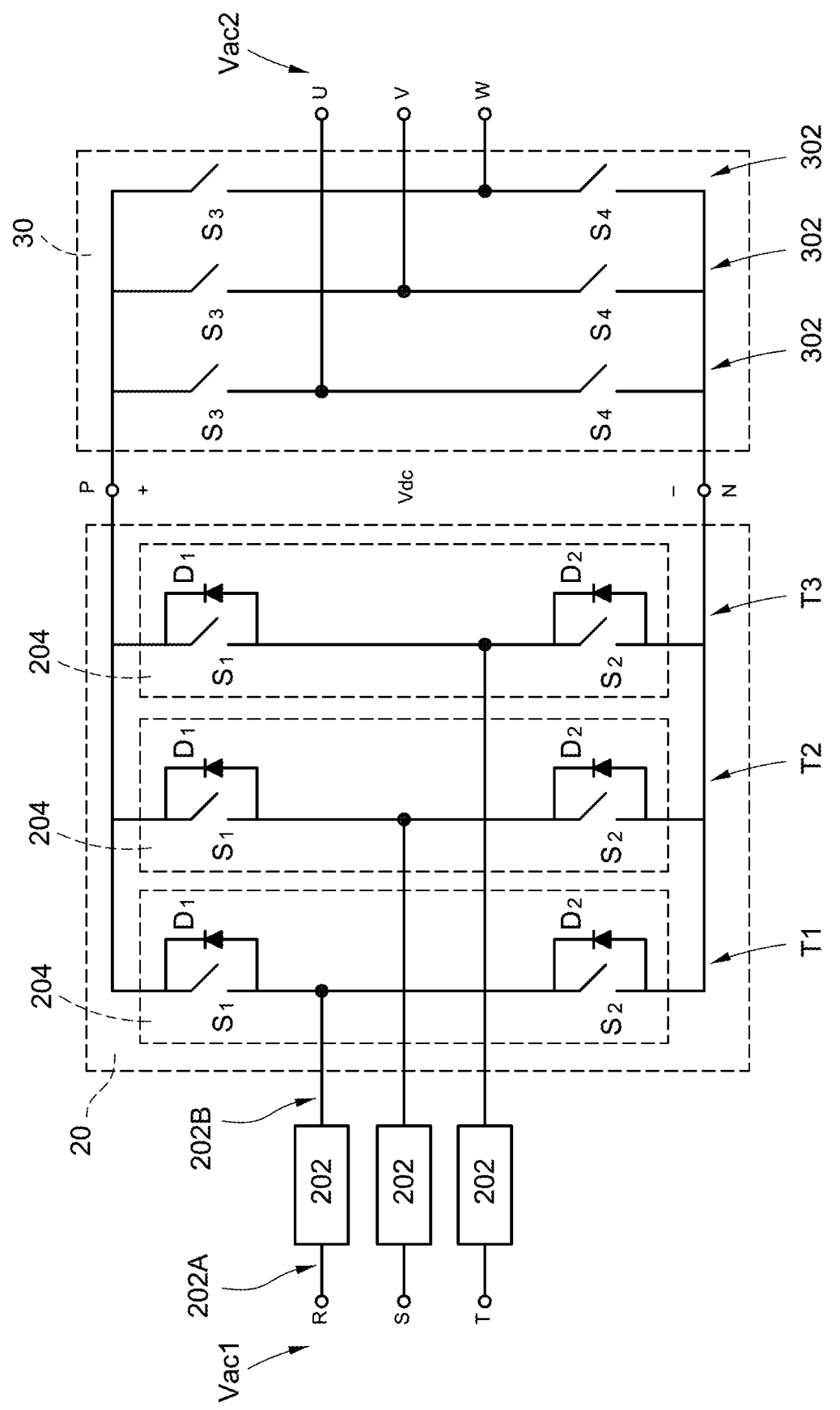
FIG. 3 is a detailed block circuit diagram of the indirect matrix converter according to the present disclosure.

Please refer to FIG. 3, which shows a detailed block circuit diagram of the indirect matrix converter according to the present disclosure, and also refer to FIG. 2. The rectifier module 20 includes three parallel-connected T-type bridge arms (T1, T2, T3), and each T-type bridge arm (T1, T2, T3) includes a bidirectional switch 202 and a power bridge arm 204. The bidirectional switch 202 has a first end 202A and a second end 202B, and the first end 202A is coupled to one phase end (R, S, T) of the first AC power source Vac1. Each power bridge arm 204 includes a first switch S1 and a second switch S2 connected in series to the first switch S1. The second end 202B of the bidirectional switch 202 is coupled to one end of the first switch S1 and one end of the second switch S2, i.e., the second end 202B is coupled to a common contact between the first switch S1 and the second switch S2. The other end of the first switch S1 is a positive polarity end P and the other end of the second switch S2 is a negative polarity end N. A bus path is composed of the positive polarity end P and the negative polarity end N, and a cross voltage of the bus path is the DC power source Vdc. A first diode D1 is coupled to the first switch S1 in parallel and a second diode D2 is coupled to the second switch S2 in parallel, and the first diode D1 and the second diode D2 may be a physical diode or a body diode.

The inverter module 30 includes three parallel-connected inverter bridge arms 302, and each inverter bridge arm 302 includes a third switch S3 and fourth switch S4 connected in series to the third switch S3. The third switch S3 is coupled to the positive polarity end P of the bus path and the fourth switch S4 is coupled to the negative polarity end N of the bus path. Three phase ends (U, V, W) of the second AC power source Vac2 are coupled to common contacts between the third switches S3 and the corresponding fourth switches S4 of the inverter bridge arms 302. Specifically, the voltage and current conversions between the first AC power source Vac1 and the second AC power source Vac2 are completed through one T-type bridge arm (T1, T2, T3) and one inverter bridge arm 302. For example, when the R-phase of the first AC power source Vac1 is converted into the U-phase of the second AC power source Vac2, the T-type bridge arm (T1) connected to R-phase and the first inverter bridge arm 302 connected to the U-phase are used. For example, when the R-phase of the first AC power source Vac1 is converted into the W-phase of the second AC power source Vac2, the T-type bridge arm (T1) connected to R-phase and the third inverter bridge arm 302 connected to the W-phase are used. That is, at any time, any phase of the first AC power source Vac1 can be directly connected to any phase of the second AC power source Vac2 since the positive polarity end P and the negative polarity end N of the bus path may not need to have an energy storage capacitor for storing the DC power source Vdc (i.e., the DC power source Vdc is time-varying). Therefore, the DC power source Vdc converted by the rectifier module 20 can be directly converted into the second AC power source Vac2 through the inverter module 30. Alternatively, the DC power source Vdc converted by the inverter module 30 can be directly converted into the first AC power source Vac1 through the rectifier module 20. The power density can be significantly increased and the volume and cost of the energy storage capacitor can be saved because of the absence of the energy storage for storing the DC power source Vdc in the indirect matrix converter 100.

Furthermore, since the first switch S1 to the fourth switch S4 are ordinary transistors, the current path of the transistor is unable to be completely disconnected when the transistor is turned off but the junction diode inside the transistor is still conductive. Therefore, if no bidirectional switch 202 is used, the current path is not completely disconnected, and the phase connection is incorrect between the first AC power source Vac1 and the second AC power source Vac2. Since the bidirectional switch 202 has the characteristic of completely blocking the bidirectional voltage and current, each phase of the rectifier module 20 may use a bidirectional switch 202 to completely and correctly disconnect each phase current path. Since only one bidirectional switch 202 is required for each phase in the rectifier module 20 (that is, the rectifier module 20 only needs three bidirectional switches 202), the cost of the rectifier module 20 can be significantly reduced and the circuit volume occupied by the rectifier module 20 can be reduced.

Figure 4B:
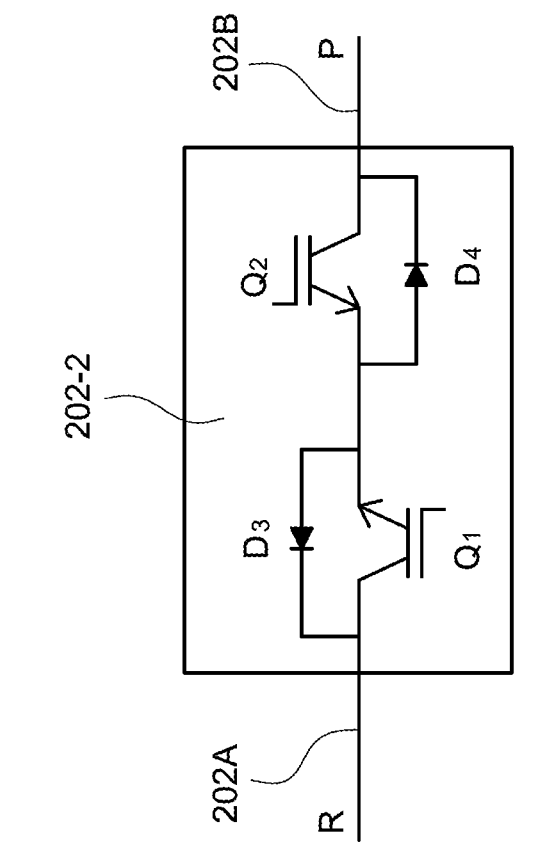
FIG. 4B is a circuit diagram of the bidirectional switch according to a second embodiment of the present disclosure.
Figure 4A:
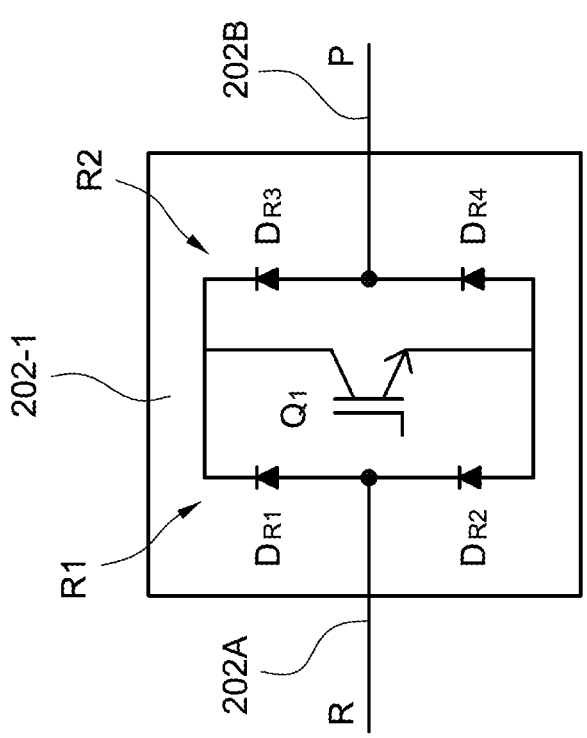
FIG. 4A is a circuit diagram of a bidirectional switch according to a first embodiment of the present disclosure.

Please refer to FIG. 4A to FIG. 4D, which show a circuit diagrams of a bidirectional switch according to a first embodiment to fourth embodiment of the present disclosure, respectively, and also refer to FIG. 2 to FIG. 3. As shown in FIG. 4A, a bidirectional switch 202-1 includes a first rectifier bridge arm R1, a first transistor Q1, and a second rectifier bridge arm R2. The first rectifier bridge arm R1, the first transistor Q1, and the second rectifier bridge arm R2 are connected in parallel to each other. The first rectifier bridge arm R1 includes a first rectifier diode DR1 and a second rectifier diode DR2 connected in series to the first rectifier diode DR1, and a common contact between the first rectifier diode DR1 and the second rectifier diode DR2 is a first end 202A of the bidirectional switch 202-1. The second rectifier bridge arm R2 includes a third rectifier diode DR3 and a fourth rectifier diode DR4 connected in series to the third rectifier diode DR3, and a common contact between the third rectifier diode DR3 and the fourth rectifier diode DR4 is a second end 202B of the bidirectional switch 202-1.

Figure 4D:
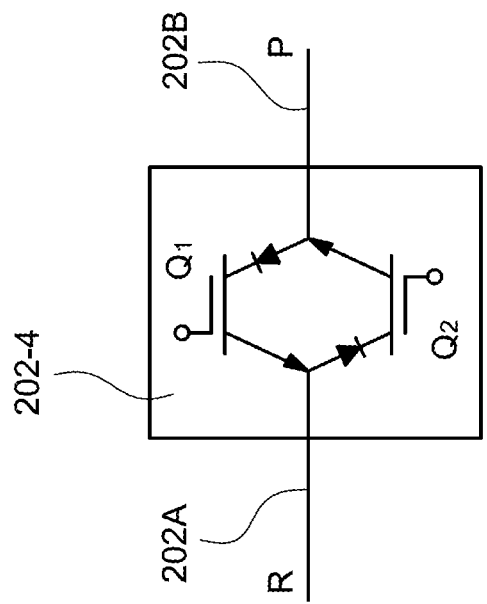
FIG. 4D is a circuit diagram of the bidirectional switch according to a fourth embodiment of the present disclosure.
Figure 4C:
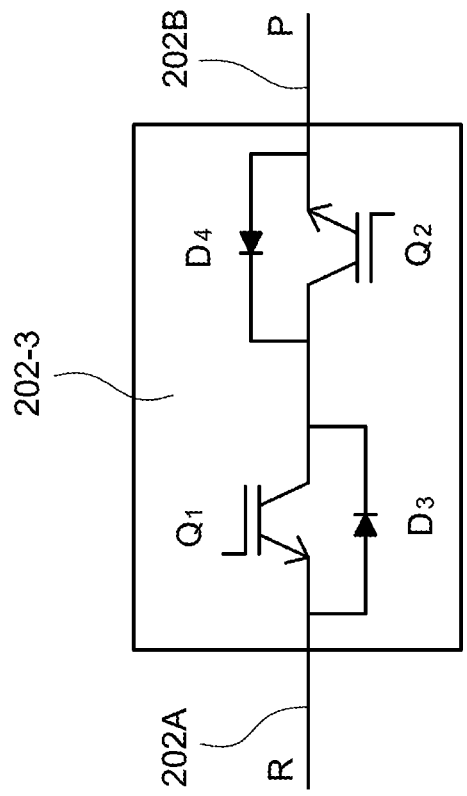
FIG. 4C is a circuit diagram of the bidirectional switch according to a third embodiment of the present disclosure.

As shown in FIG. 4B, a bidirectional switch 202-2 includes a first transistor Q1 and a second transistor Q2. The first transistor Q1 is connected to a third diode D3 in parallel, and a collector of the first transistor Q1 is a first end 202A of the bidirectional switch 202-2. The second transistor Q2 is connected to a fourth diode D4 in parallel, and a collector of the second transistor Q2 is a second end 202B of the bidirectional switch 202-2. The first transistor Q1 is connected to the second transistor Q2 in series, and an emitter of the first transistor Q1 is coupled to an emitter of the second transistor Q2. As shown in FIG. 4C, the connection structure of the bidirectional switch 202-3 is the same as that of the bidirectional switch 202-2 shown in FIG. 4B, except that the collector of the first transistor Q1 is coupled to the collector of the second transistor Q2. As shown in FIG. 4D, a bidirectional switch 202-4 includes a first transistor Q1 and a second transistor Q2. One end, such as a collector or an emitter of the first transistor Q1 is a first end 202A of the bidirectional switch 202-4, the other end, such as the emitter or the collector of the first transistor Q1 is a second end 202B of the bidirectional switch 202-4. The second transistor Q2 is coupled to the first transistor Q1 in anti-parallel so that the emitter of the second transistor Q2 is coupled to the collector of the first transistor Q1 and the collector of the second transistor Q2 is coupled to the emitter of the first transistor Q1.

Figure 5A:
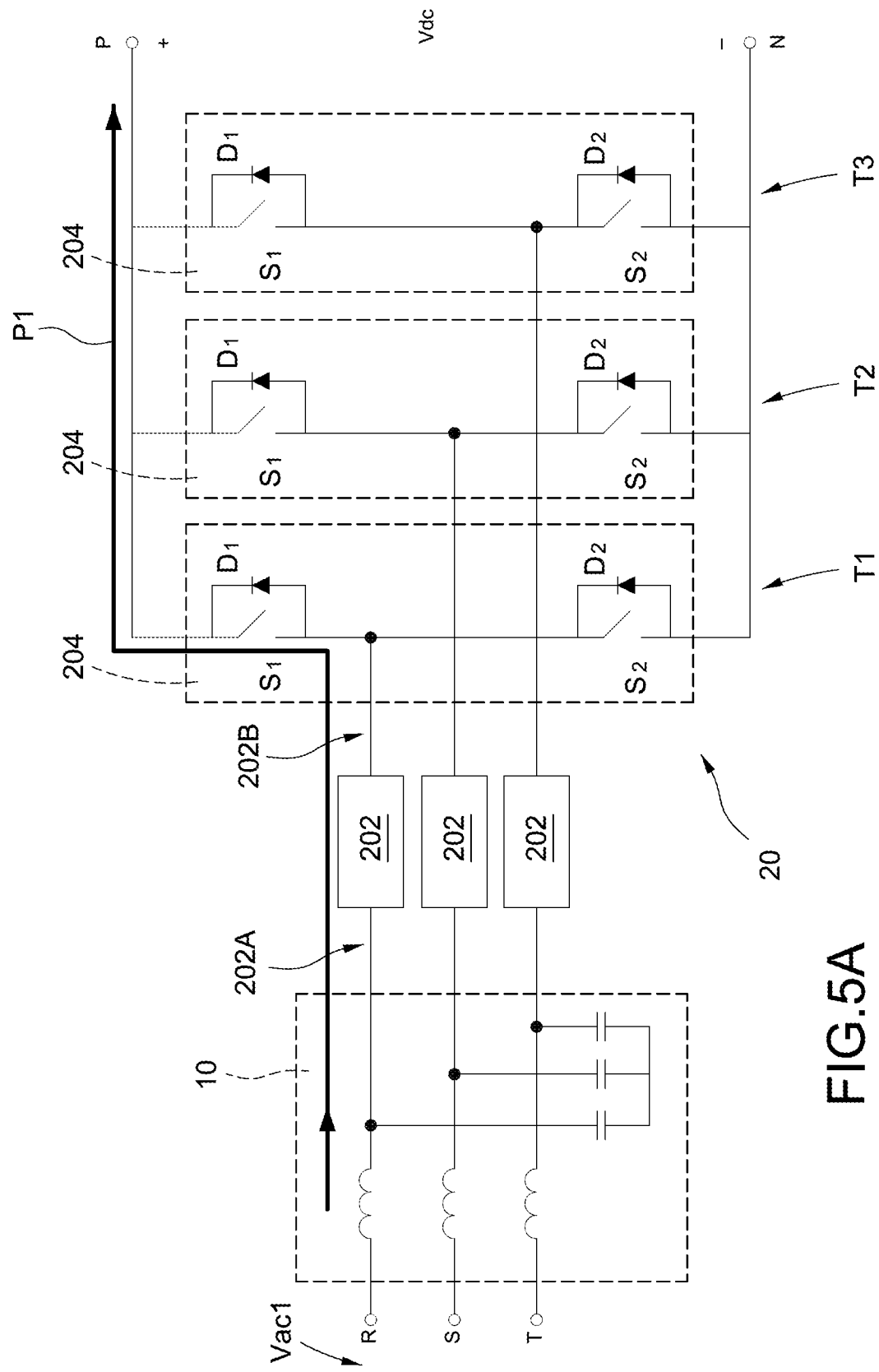
FIG. 5A is a schematic diagram of a first current path of a rectifier module according to the present disclosure.
Figure 5B:
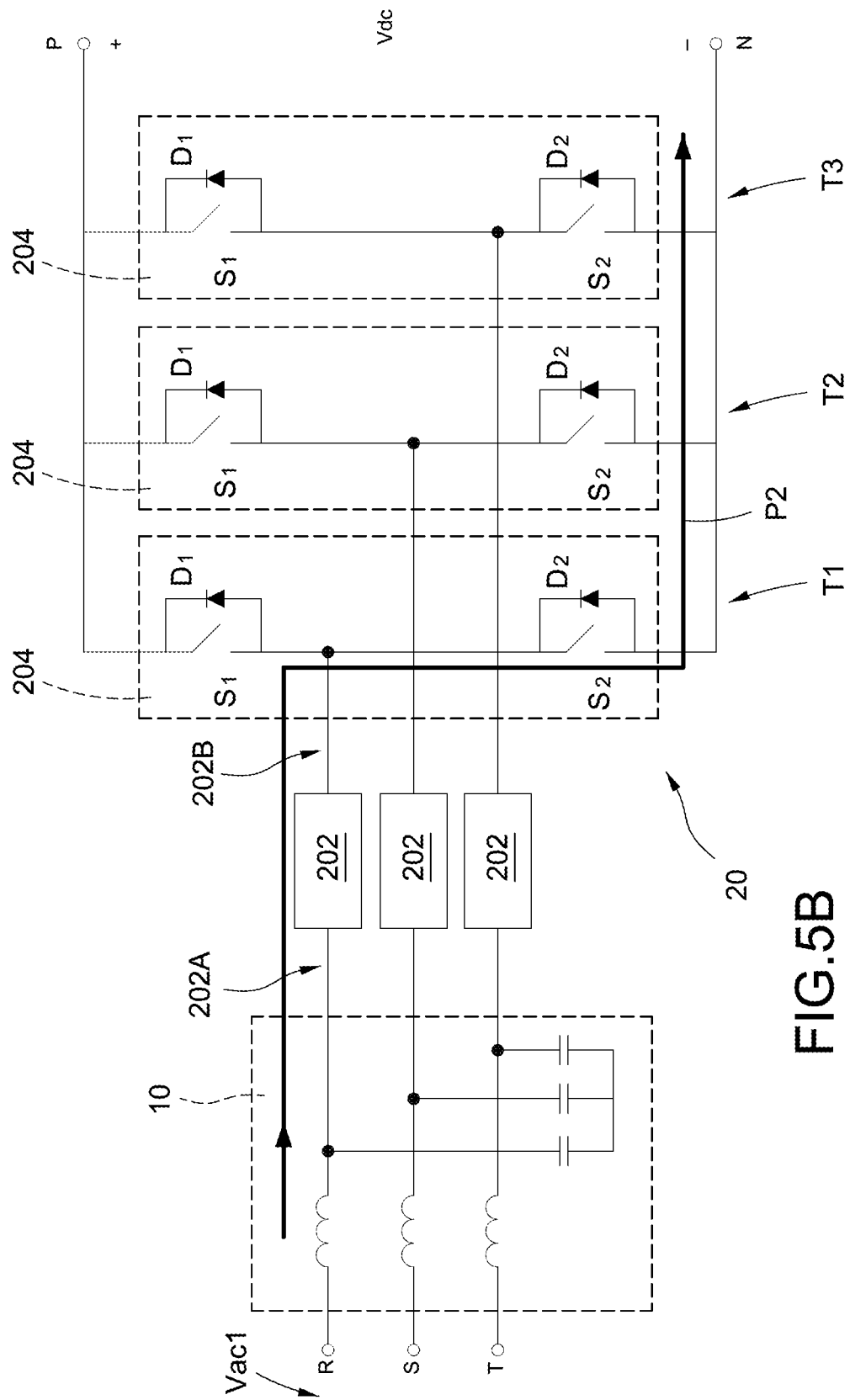
FIG. 5B is a schematic diagram of a second current path of the rectifier module according to the present disclosure.

Please refer to FIG. 5A and FIG. 5B, which show schematic diagrams of a first current path and a second current path of the rectifier module according to the present disclosure, respectively, and also refer to FIG. 2 to FIG. 4D. As shown in FIG. 5A, when the first AC power source Vac1 is positive, i.e., an AC current is greater than zero, and a DC current of the bus path is positive, i.e., the DC current is greater than zero, the first AC power source Vac1 generates a first current path P1 to the positive polarity end P. The first current path P1 is formed through the first AC power source Vac1, the bidirectional switch 202, the first diode D1, and the positive polarity end P. As shown in FIG. 5B, when the first AC power source Vac1 is positive, i.e., the AC current is greater than zero, and the DC current of the bus path is negative, i.e., the DC current is less than zero, the first AC power source Vac1 generates a second current path P2 to the negative polarity end N. At this condition, the control unit 40 outputs the control signal Sc to turn on the second switch S2, and the second current path P2 is formed through the first AC power source Vac1, the bidirectional switch 202, the second switch S2, and the negative polarity end N.

Figure 6A:
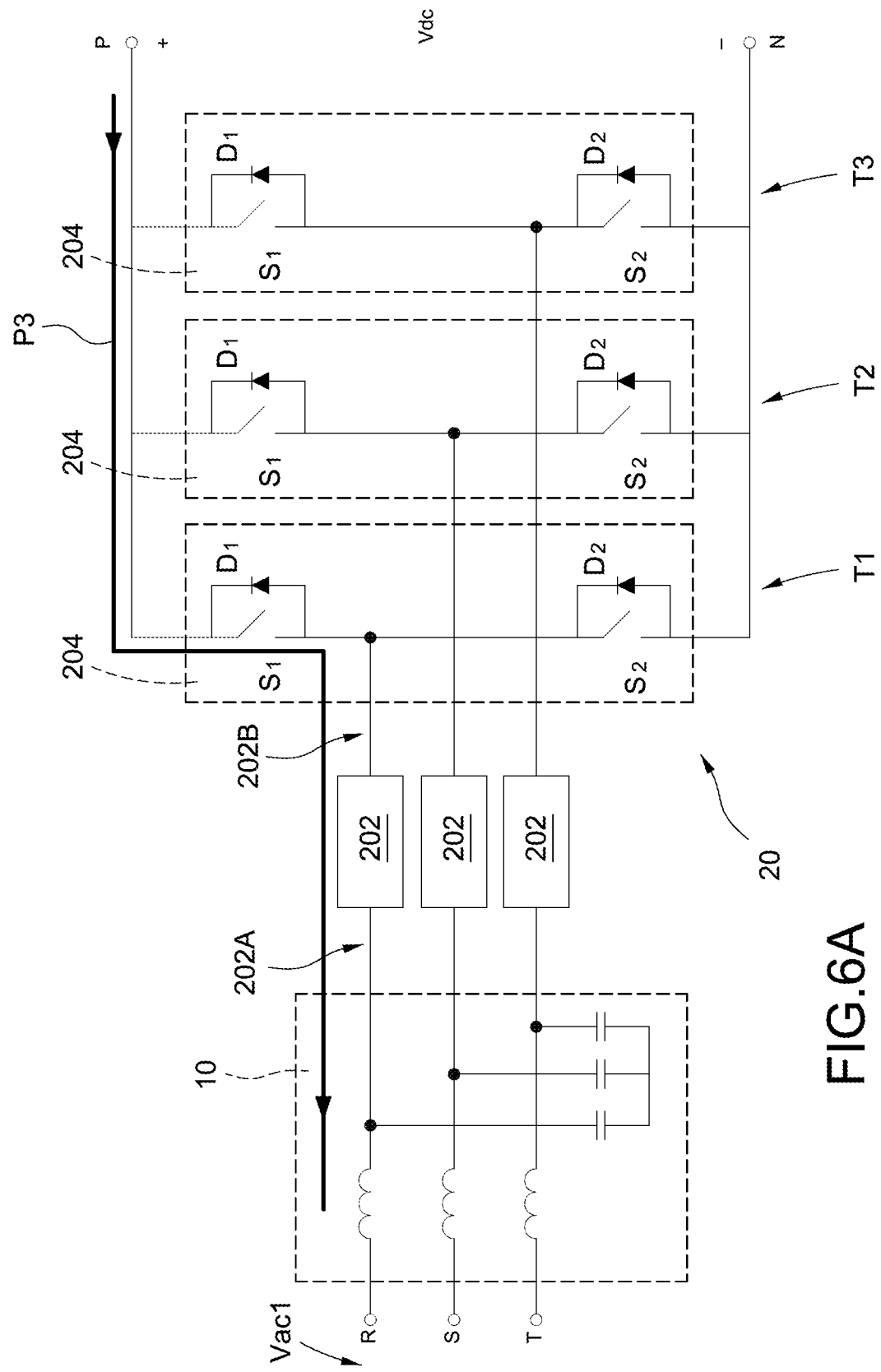
FIG. 6A is a schematic diagram of a third current path of the rectifier module according to the present disclosure.
Figure 6B:
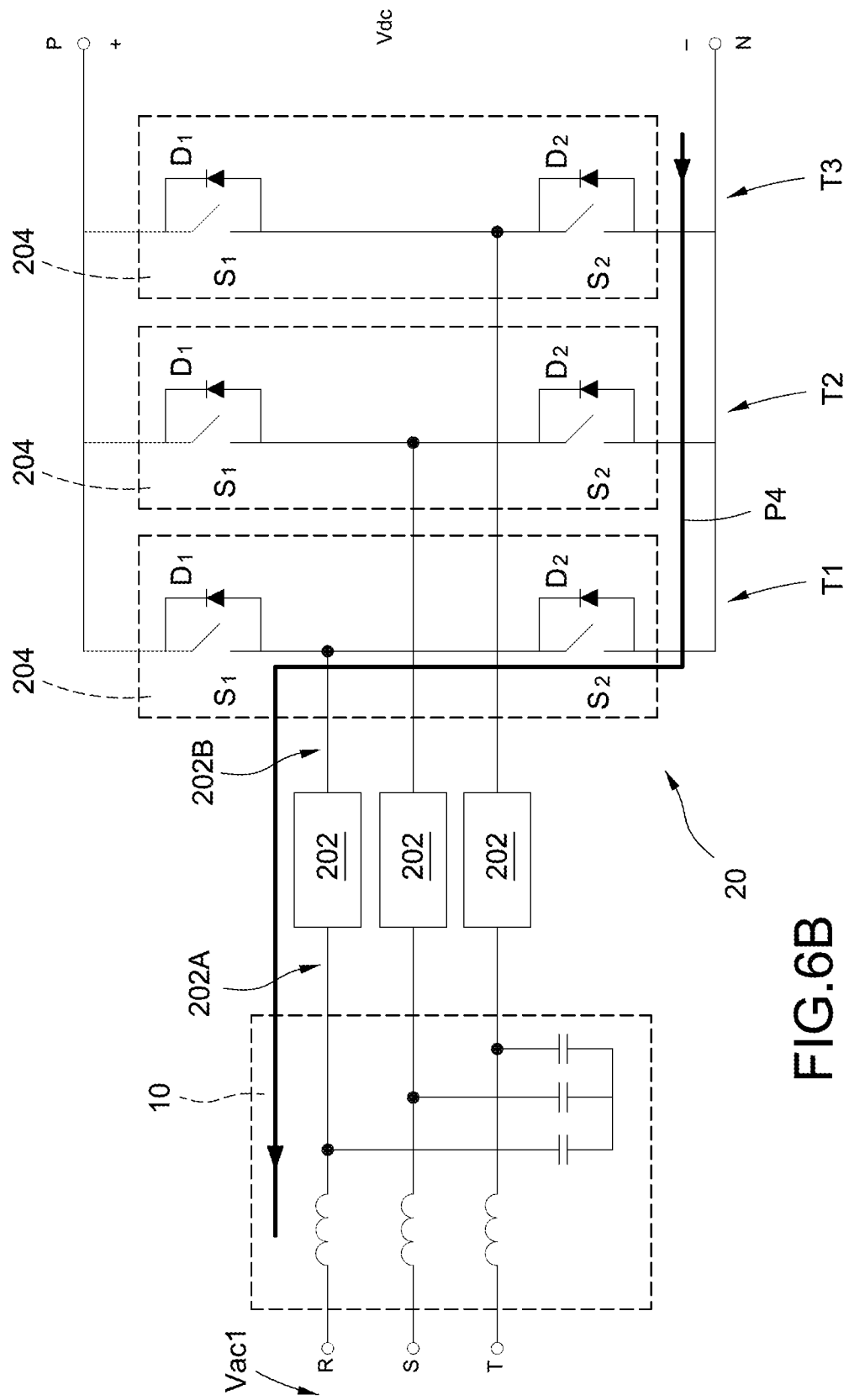
FIG. 6B is a schematic diagram of a fourth current path of the rectifier module according to the present disclosure.

Please refer to FIG. 6A and FIG. 6B, which show schematic diagrams of a third current path and a fourth current path of the rectifier module according to the present disclosure, respectively, and also refer to FIG. 2 to FIG. 5B. As shown in FIG. 6A, when the first AC power source Vac1 is negative, i.e., the AC current is less than zero, and the DC current of the bus path is negative, i.e., the DC current is less than zero, the positive polarity end P generates a third current path P3 to the first AC power source Vac1. At this condition, the control unit 40 outputs the control signal Sc to turn on the first switch S1, and the third current path P3 is formed through the positive polarity end P, the first switch S1, the bidirectional switch 202, and the first AC power source Vac1. As shown in FIG. 6B, when the first AC power source Vac1 is negative, i.e., the AC current is less than zero, and the DC current of the bus path is positive, i.e., the DC current is greater than zero, the negative polarity end N generates a fourth current path P4 to the first AC power source Vac1. The fourth current path P4 is formed through the negative polarity end N, the second diode D2, the bidirectional switch 202, and the first AC power source Vac1. In one embodiment, the three T-type bridge arms (T1, T2, T3) are controlling by the control unit 40 by detecting the phase of the first AC power source Vac1 and the phase of the second AC power source Vac2. The current paths shown in FIG. 5A to FIG. 6B are merely illustration that the T-type bridge arm T1 is selected and controlled by the control unit 40. The current paths that the other two T-type bridge arms (T2, T3) are selected and controlled by the control unit 40 are similar to those shown in FIG. 5A to FIG. 6B, and will not be described again here.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art.

What is claimed is:

1. An indirect matrix converter, comprising:
   a rectifier module coupled to a first AC power source and comprising:
      a plurality of bidirectional switches, wherein each of the bidirectional switches has a first end and a second end, and the first end of each of the plurality of bidirectional switches is individually coupled to each phase of the first AC power source, and
      a plurality of power bridge arms, wherein each of the plurality of power bridge arms comprises a first switch and a second switch, and one end of the second switch is mutually connected one end of the first switch in series to form a common node,
   wherein the second end of each of the plurality of bidirectional switches is correspondly and separately connected to the common node of each of the plurality of power bridge arms; and
   wherein, in each of the plurality of power bridge arms, the other end of the first switch being a positive polarity end of a bus path and the other end of the second switch being a negative polarity end of the bus path,
   an inverter module coupled to the bus path and a second AC power source, and
   a control unit configured to output a plurality of control signals to control the rectifier module and the inverter module so that the first AC power source converted into the second AC power source through the rectifier module and the inverter module, or the second AC power source converted into the first AC power source through the inverter module and the rectifier module,
   wherein a conversion of a voltage and a current between the first AC power source and the second AC power source are completed through one of the bidirectional switches, one of the power bridge arms correspondingly coupled to one of the bidirectional switches, and one of inverter bridge arms of the inverter module, and any phase of the first AC power source is directly connected to any phase of the second AC power source at any time through the indirect matrix converter, and
   wherein the bidirectional switches are transistor components, and the transistor components have junction diode with unidirectional forward bias inside.

2. The indirect matrix converter in claim 1, wherein the first switch is connected to a first diode in parallel and the second switch is connected to a second diode in parallel; a first current path is formed through the first AC power source, the bidirectional switch, the first diode, and the positive polarity end; a second current path is formed through the first AC power source, the bidirectional switch, the second switch, and the negative polarity end.

3. The indirect matrix converter in claim 2, wherein a third current path is formed through the positive polarity end, the first switch, the bidirectional switch, and the first AC power source; a fourth current path is formed through the negative polarity end, the second diode, the bidirectional switch, and the first AC power source.

4. The indirect matrix converter in claim 3, wherein when an AC current of the first AC power source is positive, the first current path and the second current path are provided; when the AC current is negative, the third current path and the fourth current path are provided.

5. The indirect matrix converter in claim 1, wherein the bidirectional switch comprises:
   a first rectifier bridge arm comprising a first rectifier diode and a second rectifier diode connected to the first rectifier diode in series, and a common contact between the first rectifier diode and the second rectifier diode being the first end of the bidirectional switch,
   a transistor connected to the first rectifier bridge arm in parallel, and
   a second rectifier bridge arm connected to the first rectifier bridge arm in parallel, and comprising a third rectifier diode and a fourth rectifier diode connected to the third rectifier diode in series, and a common contact between the third rectifier diode and the fourth rectifier diode being the second end of the bidirectional switch.

6. The indirect matrix converter in claim 1, wherein the bidirectional switch comprises:
   a first transistor connected to a third diode in parallel, and a collector of the first transistor being the first end of the bidirectional switch, and
   a second transistor connected to a fourth diode in parallel, and a collector of the second transistor being the second end of the bidirectional switch,
   wherein the first transistor is connected to the second transistor in series, and an emitter of the first transistor is coupled to an emitter of the second transistor.

7. The indirect matrix converter in claim 1, wherein the bidirectional switch comprises:
   a first transistor connected to a third diode in parallel, and an emitter of the first transistor being the first end of the bidirectional switch, and
   a second transistor connected to a fourth diode in parallel, and an emitter of the second transistor being the second end of the bidirectional switch,
   wherein the first transistor is connected to the second transistor in series, and a collector of the first transistor is coupled to a collector of the second transistor.

8. The indirect matrix converter in claim 1, wherein the bidirectional switch comprises:
   a first transistor, one end of the first transistor being the first end of the bidirectional switch and the other end of the first transistor being the second end of the bidirectional switch, and
   a second transistor coupled to the first transistor in antiparallel.

9. The indirect matrix converter in claim 1, wherein no energy storage capacitor is used between the positive polarity end and the negative polarity end.

10. The indirect matrix converter in claim 1, wherein the control unit is configured to output the plurality of control signals to the bidirectional switch and the power bridge arm so that the first AC power source is converted into a DC power source through the bidirectional switch and the power bridge arm, or the DC power source is converted into the first AC power source through the power bridge arm and the bidirectional switch.

11. A rectifier module coupled to a first AC power source and a control unit, and the rectifier module comprising:
   a plurality of bidirectional switches, wherein each of the bidirectional switches has a first end and a second end, and the first end of each of the plurality of bidirectional switches is individually coupled to each phase of the first AC power source, and
   a plurality of power bridge arms, wherein each of the plurality of power bridge arms comprises a first switch and a second switch, and one end of the second switch is mutually connected one end of the first switch in series to form a common node,
   wherein the second end of each of the plurality of bidirectional switches is correspondly and separately connected to the common node of each of the plurality of power bridge arms; and
   wherein, in each of the plurality of power bridge arms, the other end of the first switch being a positive polarity end of a bus path and the other end of the second switch being a negative polarity end of the bus path,
   wherein the control unit is configured to output a plurality of control signals to control the bidirectional switches and the power bridge arms so that the first AC power source is converted into a DC power source through the bidirectional switches and the power bridge arms, or the DC power source is converted into the first AC power source through the power bridge arms and the bidirectional switches,
   wherein when an AC current of the first AC power source is positive, a current path between the bidirectional switches and the positive polarity end is provided based on a DC current of the bus path being greater than zero, or the other current path between the bidirectional switches and the negative polarity end is provided based on the DC current of the bus path being less than zero,
   wherein when the AC current of the first AC power source is negative, the other current path between the bidirectional switches and the negative polarity end is provided based on the DC current of the bus path being greater than zero, or the current path between the bidirectional switches and the positive polarity end is provided based on the DC current of the bus path being less than zero, and
   wherein the bidirectional switches are transistor components, and the transistor components have junction diode with unidirectional forward bias inside.

12. The rectifier module in claim 11, wherein the first switch is connected to a first diode in parallel and the second switch is connected to a second diode in parallel; a first current path formed from the first AC power source to the positive polarity end comprises the first AC power source, the bidirectional switch, the first diode, and the positive polarity end; a second current path formed from the first AC power source to the negative polarity end comprises the first AC power source, the bidirectional switch, the second diode, and the negative polarity end.

13. The rectifier module in claim 12, wherein a third current path formed from the positive polarity end to the first AC power source comprises the positive polarity end, the first switch, the bidirectional switch, and the first AC power source; a fourth current path formed from the negative polarity end to the first AC power source comprises the negative polarity end, the second diode, the bidirectional switch, and the first AC power source.

14. The rectifier module in claim 13, wherein when an AC current of the first AC power source is positive, the first current path and the second current path are provided; when the AC current is negative, the third current path and the fourth current path are provided.

15. The rectifier module in claim 11, wherein the bidirectional switch comprises:
   a first rectifier bridge arm comprising a first rectifier diode and a second rectifier diode connected to the first rectifier diode in series, and a common contact between the first rectifier diode and the second rectifier diode being the first end of the bidirectional switch,
   a transistor connected to the first rectifier bridge arm in parallel, and
   a second rectifier bridge arm connected to the first rectifier bridge arm in parallel, and comprising a third rectifier diode and a fourth rectifier diode connected to the third rectifier diode in series, and a common contact between the third rectifier diode and the fourth rectifier diode being the second end of the bidirectional switch.

16. The rectifier module in claim 11, wherein the bidirectional switch comprises:
   a first transistor connected to a third diode in parallel, and a collector of the first transistor being the first end of the bidirectional switch, and
   a second transistor connected to a fourth diode in parallel, and a collector of the second transistor being the second end of the bidirectional switch,
   wherein the first transistor is connected to the second transistor in series, and an emitter of the first transistor is coupled to an emitter of the second transistor.

17. The rectifier module in claim 11, wherein the bidirectional switch comprises:
   a first transistor connected to a third diode in parallel, and an emitter of the first transistor being the first end of the bidirectional switch, and
   a second transistor connected to a fourth diode in parallel, and an emitter of the second transistor being the second end of the bidirectional switch,
   wherein the first transistor is connected to the second transistor in series, and a collector of the first transistor is coupled to a collector of the second transistor.

18. The rectifier module in claim 11, wherein the bidirectional switch comprises:
   a first transistor, one end of the first transistor being the first end of the bidirectional switch and the other end of the first transistor being the second end of the bidirectional switch, and
   a second transistor coupled to the first transistor in anti-parallel.

* * * * *